United States Patent

[11] 3,624,190

[72] Inventors Joseph Cekada, Jr.;
 Edwin E. Reinink, both of Midland, Mich.
[21] Appl. No. 646,474
[22] Filed June 16, 1967
[45] Patented Nov. 30, 1971
[73] Assignee Dow Corning Corporation
 Midland, Mich.

[54] METHOD FOR RELEASING POLYURETHANE FOAM FROM A MOLD
 10 Claims, No Drawings

[52] U.S. Cl. .................................................. 264/41,
 260/2.5 AZ, 260/46.5 R, 260/448.2 R, 264/48,
 264/54, 264/338, 264/DIG. 14
[51] Int. Cl. ....................................................... B29d 27/04,
 C08g 22/04, C08g 22/46, C08g 31/62
[50] Field of Search............................................ 264/54,
 338, 213, 41, 53, 48, DIG. 14; 260/46.5 R, 448.2
 R, 2.5 AZ

[56] References Cited
 UNITED STATES PATENTS

| 3,492,394 | 1/1970 | Heine ........................... | 260/46.5 X |
| 3,186,964 | 6/1965 | Kookootsedes et al. ....... | 264/338 X |
| 3,341,646 | 9/1967 | Britain........................... | 264/213 |
| 3,382,150 | 5/1968 | Grass et al. ................... | 264/338 X |
| 3,406,236 | 10/1968 | Kniege ......................... | 264/338 |

FOREIGN PATENTS

| 624,114 | 7/1961 | Canada ........................ | 264/338 |

OTHER REFERENCES

Injection Molders Supply Co. " IMS Silicone Spray Mold Release," (Bulletin) 20 or 9- 54. Sept. 1954, pp. 1— 4. Copy in 264- 338.

Stoners Ink Co. (Bulletin). " Plastic Mold Releases," Feb. 10, 1964, pp. 1, 2, 5 and 7. Copy in 264- 338.

*Primary Examiner*— Philip E. Anderson
*Attorneys*— Robert F. Fleming, Jr., Laurence R. Hobey and Harry D. Dingman ABSTRACT: The deposition of a diorganopolysiloxane in liquid form on the surface of a mold is used in making polyurethane foam articles. The diorganopolysiloxane is a release agent for polyurethane foam when applied on a mold surface which has been treated with a conventional release agent. The steps of the method include depositing a conventional mold release agent on the surface of a mold, applying the diorganopolysiloxane over the conventional mold release agent, placing a polyurethane foam composition in the mold, allowing the foam to rise, curing the polyurethane foam and demolding the polyurethane foam product. the diorganopolysiloxanes have siloxane units of $R(CH_3)SiO$, at least 50 mol percent,

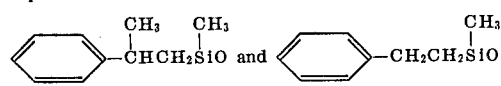

up to 40 mol percent, and $R'(CH_3)$ SiO, up to 10 mol percent, wherein R is an alkyl radical of three to 30 carbon atoms and R' is methyl, ethyl, phenyl, benzyl and $R''O(C_nH_{2n}O)_x(CH_2)_{3^-}$ —and the diorganopolysiloxane can be end blocked by hydroxyl groups or triorganosiloxy groups.

METHOD FOR RELEASING POLYURETHANE FOAM FROM A MOLD

Molded articles prepared from polyurethane foam are widely used and thus the manufacture of such articles is of great commercial importance. The molding of polyurethane foam is unique in its problems and early work resulted in a high percentage of rejected foamed articles. The polyurethane composition foams and produces a positive pressure in the mold, as a result the polyurethane foam adheres to the walls of the mold and great difficulty is encountered in removing the foamed article from the mold without damaging it. To assist in the removal of the foamed article, release agents were tried. Many of the common mold release agents are not suitable for the use of releasing polyurethane foams from molds. Many of the mold release agents conventionally used for rubbers, and other synthetic materials, either do not release polyurethane foams or are detrimental to the polyurethane foam formation. Many mold release agents are defoamers for polyurethane foam and thus cannot be used. Other release agents give foamed articles with irregular skin thickness which often results in hard spots.

Some of the materials which have been used as mold release agents for polyurethane foam molds include polyethylene, fluorocarbon polymers such as polytetrafluoroethylene, silicone resins, organic waxes, and even silicone rubbers. However, although silicone oils are known release agents, as well as mold release agents for rubbers and other synthetic polymer materials, they are not release agents for polyurethane foams. This is documented by Bernard A. Dombrow in "Polyurethanes," Reinhold Plastics Applications Series, Reinhold Publishing Corporation, New York, 1957, page 43. The silicone oils are pushed by the rising foam to expose fresh mold surface to which the polyurethane foam adheres. Silicone oils and fluids such as polydimethylsiloxane, polyphenylmethylsiloxane and polyethylmethylsiloxane are not suitable as mold release agents for polyurethane foams inasmuch as they do not provide any release.

It was therefore totally unexpected that the applicant found a class of silicone polymers, including many which are liquids at room temperature, which are mold release agents for polyurethane foams.

The method of using a mold release agent such as in flexible polyurethane foams is described by J. L. Zuckerman, in "The Art of Molding Flexible Urethane Foam," *Society of Plastics Engineers Journal*, Vol. 22, No. 5, May 1966, pages 56–59. Zuckerman describes the method of molding polyurethane foam which includes the steps of applying a mold release agent, placing a polyurethane foam composition into the treated mold, allowing the foam to rise, curing the polyurethane foam and demolding to obtain a cured polyurethane foam product. Zuckerman describes the use of permanent mold release agents, temporary mold release agents and a combination of both permanent and temporary mold release agents.

The present invention relates to a method of molding polyurethane foam comprising depositing a mold release agent on the surface of a mold whereby a treated mold surface is obtained, placing a polyurethane foam composition into the treated mold, allowing the foam to rise, curing the polyurethane foam and demolding to obtain a cured polyurethane foam product in which the improvement consists essentially of 1. applying to the treated mold surface a diorganopolysiloxane in a liquid state wherein the diorganopolysiloxane consists essentially of
   a. at least 50 mol percent $R(CH_3)SiO$ units wherein each R is an alkyl radical having from three to 30 inclusive carbon atoms,
   b. up to 40 mol percent of units selected from the group consisting of

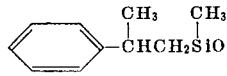

units and

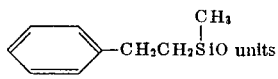

c. any remaining chain building units in an amount up to 10 mol percent being $R'(CH_3)SiO$ units wherein each R' is a monovalent organic radical selected from the group consisting of methyl, ethyl, phenyl, benzyl, and $R''O(C_nHO)_x(CH_2)_3-$ wherein each R'' is a monovalent organic radical selected from the group consisting of methyl, ethyl, propyl, butyl,

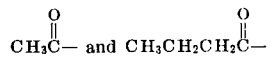

n is an integer from 2 to 3 inclusive, and x is an integer from 1 to 25 inclusive, and the polymer chains being endblocked by groups selected from the group consisting of triorganosiloxy groups and hydroxyl groups, the organo radicals being selected from the group consisting of

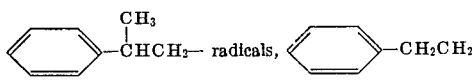

radicals, R and R' radicals, and removing any volatile materials from the diorganopolysiloxane treated mold and thereafter 2. bringing the diorganopolysiloxane treated mold to a pour temperature for a polyurethane foam composition.

An object of the present invention is to provide a method of releasing polyurethane foams from molds in which the polyurethane foams release from the mold with ease, in which the mold release agent is not detrimental to the polyurethane foam at any point during the molding process and in which the mold release agent improves the quality of the polyurethane foam. This object and others are apparent from the following detailed description of the invention.

The mold can be an open or closed mold. The present invention, however, resolves the problems of release of polyurethane foam from closed molds. The shape of the mold is not critical. The material of which the mold is made of is of no significance. As long as the material can be used in preparing a mold for polyurethane foam, it can be used in the present invention. Such conventional materials of which molds are made, include wood, masonite, plaster of paris, silicone rubber and metals such as aluminum, magnesium, stainless steel, iron and various alloys. The preparation of the mold is carried out by conventional means. The preparation of the surface of the mold which is in contact with the polyurethane foam is carried out in any manner which is normally used, such as making the surface of porous mold materials nonporous as in the case of wood and masonite in which a phenolic varnish is usually used to coat the surface of the mold to make it smooth. The term "mold surface" will be used herein to mean the surface of the mold which comes into contact with the polyurethane foam.

The mold surface should be cleaned as usual before using any mold release agent. Any scraps of foam should be removed and a solvent wash is usually desirable. Even new molds should receive a solvent wash to ensure a clean surface prior to the application of any mold release material.

The mold surface thus prepared according to prior art methods is ready to receive a mold release agent. The mold surface is coated with a conventional mold release agent which includes polyethylene, fluorocarbon polymers such as polytetrafluoroethylene, silicone resins, silicone rubber and organic waxes. These mold release agents are well known in the art and are applied by prior art methods. The mold is usually heated to either cure the mold release agent or to drive off any volatile materials which might be used as aids in applying the mold release agent. Volatile materials such as solvents, or byproducts from the curing reaction are detrimental to the quality of the polyurethane foam and thus should be removed.

The mold having been treated with the conventional mold release agent and the volatiles removed is now ready for the application of the diorganopolysiloxane.

The diorganopolysiloxane is applied to the treated mold surface in a liquid state. The term "liquid state" as used herein refers to the state of the diorganopolysiloxane being liquid at the temperature of application to the treated mold wherein the liquid state can be a molten state of the diorganopolysiloxane per se, an organic solvent solution of the diorganopolysiloxane, a liquid diorganopolysiloxane at room temperature or an aqueous emulsion of the diorganopolysiloxane.

The diorganopolysiloxane, further described herein, of this invention is applied to the treated mold surface in a liquid state. The mold does not need to be heated to any specific temperature, inasmuch as the diorganopolysiloxane can be applied at room temperature. When applied at room temperature, the diorganopolysiloxane used should be a liquid diorganopolysiloxane at room temperature or a molten diorganopolysiloxane, preferably a liquid diorganopolysiloxane at room temperature. When the mold is not heated, the liquid diorganopolysiloxane can be applied by spraying from an aerosol container, a spray gun or wiping on with a cloth or sponge treated with the liquid diorganopolysiloxane. Inasmuch as large quantities of diorganopolysiloxane should not be used and that very small amounts such as 0.0001 g./in.$^2$ of treated mold surface are very satisfactory, a method should be selected to give the most economically treated mold. It is therefore advised that a wiping method be used when applying diorganopolysiloxane which is a liquid at room temperature or that the mold be wiped to remove any excesses of diorganopolysiloxane when spraying is used as a method of application.

Although the application of the diorganopolysiloxane at room temperature has the advantage of permitting the mold to be treated ahead of time without the necessity of using any heating device, most production units of molded polyurethane foam are already set up and no inconveniences are found in having to heat the mold prior to applying a diorganopolysiloxane. Furthermore, it is advantageous to treat heated molds with the diorganopolysiloxane because the molds after having the polyurethane foam removed are usually hot and if one immediately applies the diorganopolysiloxane, the mold can go through the cycle again and thus a continuous-type operation can be effected.

The present method of using the liquid diorganopolysiloxane of the present invention is especially suitable for application to a hot mold. Many advantages are found by applying the liquid diorganopolysiloxane to a hot-treated mold. Any of the liquid diorganopolysiloxane described herein can be used, but the most suitable is the organic solvent solution of the diorganopolysiloxane. By using an organic solvent solution of the diorganopolysiloxane, one can use very dilute solutions and thus easily regulate the amount of diorganopolysiloxane on the surface of the mold. The organic solvent solution can be applied from aerosol containers which is the preferred method, wiped on, brushed on and the like. However, any method of applying the diorganopolysiloxane would be suitable. The diorganopolysiloxane is applied in amounts of from 0.00001 to 0.1 gram of diorganopolysiloxane per square inch of treated mold surface. Amounts greater than 0.1 gram per square inch tend to give polyurethane foamed products a sticky or greasy surface due to the excess diorganopolysiloxane. Amounts less than 0.00001 gram per square inch do not provide satisfactory release of the polyurethane foam from the mold surface. The organic solvent can be selected to give the proper cooling effect to the mold, the organic solvent will also be easier to volatalize out of the mold and no problems are encountered with water and surfactants.

The organic solvent solution of the diorganopolysiloxane is applied to a heated mold wherein the temperature of the mold is preferably from 150° to 300° F. The organic solvents which are suitable include any organic solvent which dissolves the diorganopolysiloxane and is unreactive with the diorganopolysiloxane. The organic solvent is preferably volatile within the temperature range of 150° F. to 300° F. for easy removal from the mold. The organic solvents operable in this invention include naphthas, mineral spirits, aromatic hydrocarbons, aliphatic hydrocarbons, chlorinated hydrocarbons and ketones. Some specific examples of aromatic hydrocarbons include benzene, toluene and xylene; aliphatic hydrocarbons include pentane, cyclohexane, hexane, heptane, octane, nonane; chlorinated hydrocarbons include carbon tetrachloride, chloroform, perchloroethylene, chlorobenzene, chlorotoluene, dichlorobenzene, and ketones such as acetone, cyclohexanone, methylethylketone, butyrone, diethylketone, dipropylketone, ethylmethylketone, cycloheptonone, cyclopentanone, benzophenone, methylisobutylketone, and methylisopropylketone.

The diorganopolysiloxane is preferably applied to the mold in the form of dilute solutions or organic solvents wherein the preferred amount of the diorganopolysiloxane mold release agent in the organic solvent is from 1 to 10 weight percent of the solution. The best results are obtained when the diorganopolysiloxane is present in amounts from 1 to 5 weight percent of the solution. The concentration of the diorganopolysiloxane is not limited to 1 to 10 weight percent and any range can be used. However, the ease of application, economical factors and the accurate regulation of the amount of the diorganopolysiloxane on the mold surface, usually encourages the use of organic solvent solutions with 1 to 10 weight per cent of the diorganopolysiloxane.

When aqueous emulsions of the diorganopolysiloxane are used, the aqueous emulsions are prepared in the conventional manner. The diorganopolysiloxane can be emulsified by using water and conventional surfactants such as $C_{12}H_{25}O(CH_2CH_2O)_xH$ where $x$ is 5 to 10,

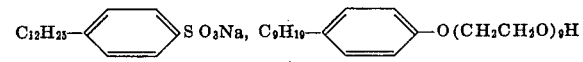

and $C_{12}H_{25}SO_3Na$. The concentration of the diorganopolysiloxane in the aqueous emulsion can vary broadly, but the preferred amount is the same as used in the organic solvent solutions.

The diorganopolysiloxane consisting essentially of $R(CH_3)SiO$ units and any of the other chain-building siloxane units can be

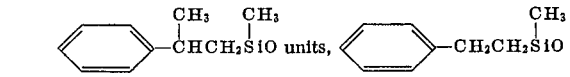

units, and $R'(CH_3)SiO$ units and the endblocking units are either hydroxy groups or triorganosiloxy groups.

In the diorganopolysiloxane, the $R(CH_3)SiO$ units must be present in amounts of at least 50 mol percent, based on the total number of chain building siloxane units in the polymer, preferably the $R(CH_3)SiO$ units are present in amounts of at least 75 mol percent. In the $R(Ch_3)SiO$ units, the R represents an alkyl radical having from three to 30 carbon atoms. Examples of R include propyl, butyl, pentyl, hexyl, heptyl, octyl, nonyl, decyl, hendecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl and triacontyl. The alkyl radicals can be straight chain, branched or cyclic. Representative of $R(CH_3)SiO$ units are

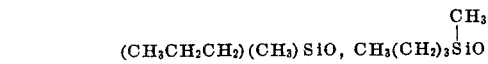

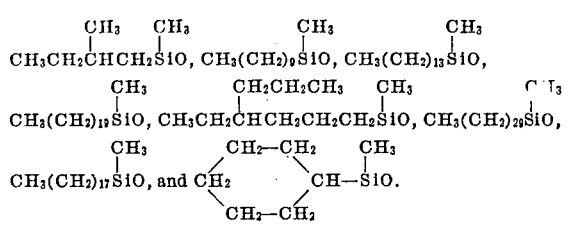

The

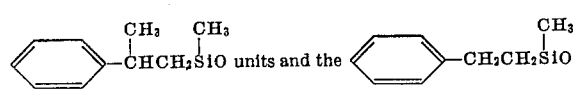

units can be present in amounts up to 40 mol percent, based on the total number of chain building siloxane units in the diorganopolysiloxane, preferably these units are present in amounts of up to 25 mol percent.

Other chain-building siloxane units which can be present in minor amounts, up to 10 mol percent, have a general formula of R'(CH$_3$)SiO in which R' is a monovalent organic radical selected from methyl, ethyl, phenyl, benzyl, or R''O(C$_n$H$_{2n}$O)$_x$(CH$_2$B$_3$ 3—radicals, preferably these units are absent from the diorganopolysiloxane. R'' can be a monovalent organic radical such as methyl, ethyl, propyl, butyl, $$CH_3\overset{O}{\overset{\|}{C}}-\text{ or }CH_3CH_2CH_2\overset{O}{\overset{\|}{C}}-\text{ and } u \text{ is 2 or 3 and } x \text{ is 1 to 25.}$$

Representative of the R'(CH$_3$)SiO units are (CH$_3$)$_2$SiO, (CH$_3$CH$_2$)(CH$_3$)SiO, (C$_6$H$_5$)(CH$_3$)SiO, (C$_6$H$_5$CH$_2$)(CH$_3$)SiO,

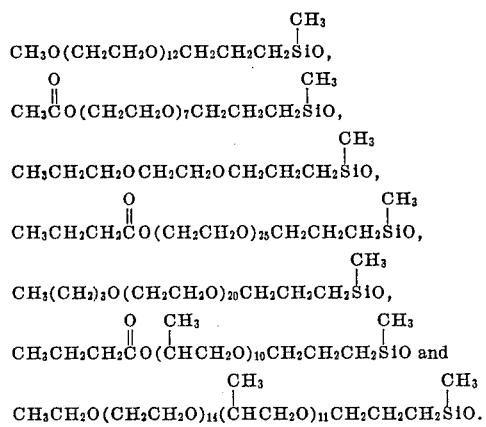

The diorganopolysiloxanes are endblocked with either hydroxyl groups or triorganosiloxy groups. In the triorganosiloxy groups, the organic radicals can be any organic radical defined above for R and R' and

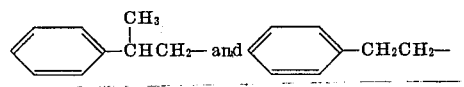

radicals. Representative of the triorganosiloxy groups are (CH$_3$)$_3$SiO$_{0.5}$, (CH$_3$CH$_2$)(CH$_3$)$_2$SiO$_{0.5}$, (CH$_3$CH$_2$CH$_2$)(CH$_3$)$_2$SiO$_{0.5}$, (CH$_3$CH$_2$)$_2$(CH$_3$)SiO$_{0.5}$, [CH$_3$(CH$_2$)$_9$] (CH$_3$)$_2$SiO$_{0.5}$, (C$_6$H$_5$)(CH$_3$)$_2$SiO$_{0.5}$, [CH$_3$(CH$_2$)$_{13}$] (CH$_3$)$_2$SiO$_{0.5}$, (CH$_3$CH$_2$CH$_2$)$_3$SiO$_{0.5}$, (C$_6$H$_5$)$_2$(CH$_3$)SiO$_{0.5}$, [CH$_3$(CH$_2$)$_{29}$] (CH$_3$CH$_2$)(CH$_3$)SiO$_{0.5}$, [CH$_3$(CH$_2$)$_{17}$] (CH$_3$)$_2$SiO$_{0.5}$,

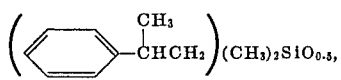

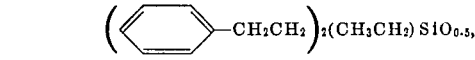

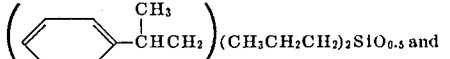

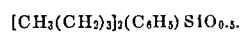

[CH$_3$(CH$_2$)$_3$]$_2$(C$_6$H$_5$) SiO$_{0.5}$.

The diorganopolysiloxanes used in this invention are known materials and can be prepared by prior art methods. A crude representation to the diorganopolysiloxane would be

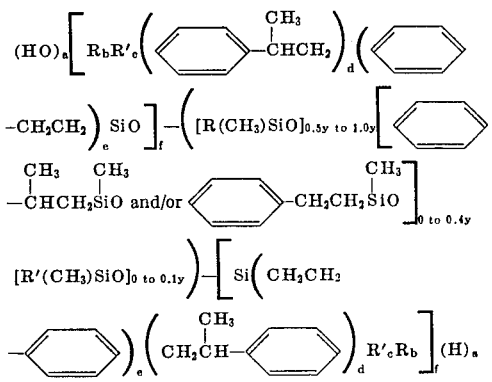

wherein $a$ is 0 or 1, $f$ is 0 or 1, $b$ is 0, 1, 2 or 3, $c$ is 0, 1, 2, or 3, $d$ is 0, 1, 2 or 3, $e$ is 0, 1, 2 or 3, the sum of $b+c+d+e$ does not exceed 3, $y$ is the total number of chain building, siloxane units present in the diorganopolysiloxane. The value of $y$ is such that the diorganopolysiloxane has a viscosity of at least 500 cs. at 25° C. and is liquid during the demolding step. The diorganopolysiloxane can thus vary from liquids to solids.

The diorganopolysiloxanes used in this invention can be prepared by the methods described in British Pat. No. 1,041,870 wherein alpha olefins are reacted with methylhydrogen siloxane polymers or alpha olefins are reacted with methylhydrogendichlorosilanes which are then hydrolyzed to produce the diorganosiloxanes. The reaction is carried out in the presence of platinum. These methods can be used to prepare any of the diorganopolysiloxanes of this invention. For example, the alpha olefins can include propene-1, butene-1, pentene-1, hexene-1, heptene-1, octene-1, decene-1, pentadecene-1, octadecene-1, pentacosene-1, triacontene-1, t-ethylheptene-1 and 5-methyl-3-propyloctene-1. The methylhydrogen siloxane polymers or methylhydrogendichlorosilane can be reacted with alpha-methylstyrene or styrene by this same method, which is further shown by U.S. Pat. Nos. 3,088,964 and 3,186,964.

The diorganopolysiloxanes can be either homopolymers or copolymers. The preferred diorganopolysiloxanes of this invention are (CH$_3$)$_3$SiO[R(CH$_3$)SiO]$_y$Si(CH$_3$)$_3$,
HO[R(CH$_3$)SiO]$_y$H,
R(CH$_3$)$_2$SiO[R(CH$_3$)SiO]$_y$Si(CH$_3$)$_2$R, and polymers wherein any of the above also contain siloxane units of the formula

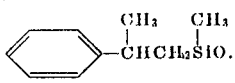

After the diorganopolysiloxane has been applied to the treated mold, any volatile materials, such as solvent, is removed by passing air or nitrogen over the mold surface, by heating, by using heated air or nitrogen, by using reduced pressure or any combination of the above to ensure complete removal of the volatiles. When the diorganopolysiloxane is applied to a hot mold, the volatiles usually come off immediately and a slight air or nitrogen sweep of the mold ensures complete removal.

After the removal of the volatiles, the diorganopolysiloxane treated mold is ready to receive the polyurethane foam composition. The mold is taken to the pour temperature for the particular polyurethane foam composition and type of mold. If the mold is cold, the mold is heated and if the mold is hot, the mold is allowed to cool. Under most conditions except such time as the introduction of a new mold into the production line or at startup, the mold is usually hot from the previous molding operation and the application of the diorganopolysiloxane organic solvent solution aids in the reduction of the mold temperature by evaporation of the organic solvent.

The diorganopolysiloxane is suitable for rigid, semirigid or flexible polyurethane foams and for both polyether and polyester polyurethane foams. The exact temperatures and conditions will thus vary accordingly per conventional methods. The polyurethane foam composition is poured into the mold, allowed to rise, cured and demolded by conventional methods.

After the polyurethane foam is demolded, the diorganopolysiloxane is then applied again and the cycle can continue. It is not necessary to apply the diorganopolysiloxane each time the mold is used. However, it is preferred to apply the diorganopolysiloxane each time because small amounts of the diorganopolysiloxane are used, and a good foamed product is released each time.

The diorganopolysiloxanes of this invention are outstanding mold release materials when used according to the method of this invention. The polyurethane foams release very easily from the molds. The skin on the polyurethane foam is thinner and is an integral part of the foam. The skin of rigid foams is very thin or absent. The foams rise higher and less foam is required for a given mold than was previously required. The amount of mold buildup is greatly reduced. The diorganopolysiloxanes when used by this method are efficient and low in cost. Improved reduction of the mold is obtained by better fill of the mold. Some of the foam compositions can be foamed at low temperatures and demolded at low temperatures because the diorganopolysiloxane is a liquid at room temperature.

The diorganopolysiloxane is applied over a conventional mold release agent, such as an organic wax. Normally, the organic wax used as a mold release is applied each time a polyurethane form article is made. However, when the diorganopolysiloxane of this invention is used, the organic wax is not reapplied each time. The diorganopolysiloxane allows the wax to be used over and over; only the diorganopolysiloxane is reapplied after each foamed article. This reduces the mold buildup normally associated with the use of an organic wax and also gives improved release and improved polyurethane foamed articles. Organic waxes are very widely used commercially as mold release agents for polyurethane foams because they can be applied easier and removed easier than mold release materials which are cured.

The number of rejected polyurethane foamed articles is reduced to an insignificant level and thus the cost due to rejects is eliminated, wherein the release agent is concerned.

The diorganopolysiloxane should not be used where temperatures exceed 325° F. for periods of time longer than 10 minutes.

The following examples are illustrative only and should not be construed as limiting the invention which is properly delineated in the appended claims.

EXAMPLE 1

A closed aluminum pan mold was cleaned by scraping out adhered foam and release wax residue and then thoroughly washing with acetone. The clean mold was heated to 220° F. and a thin, even layer of a conventional release wax was applied to the hot mold surface. The mold was then heated to 220° F. and held at this temperature to 220° F. and held at this temperature until the solvents were volatilized. A thin, even diorganopolysiloxane coating was applied to the hot mold surface. The diorganopolysiloxane used was a trimethylsiloxy end-blocked polymer composed of 40 mol percent decylmethylsiloxane units, 40 mol percent tetradecylmethylsiloxane units and 20 mol percent

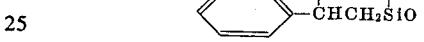

units having a viscosity of 1,200 cs. at 25° C., a specific gravity of 0.91, a refractive index of 1.4640 and a freeze point of −21° C. The diorganopolysiloxane was dissolved in naphtha in an amount of 2 weight percent and packaged in an aerosol container using dichlorodifluoromethane as the propellant. The amount of diorganopolysiloxane applied to the mold surface was about 0.001 grams per square inch of mold surface. The treated mold was reheated to 220° F. to allow the solvents to volatilize. The treated mold was then cooled to 110° F., the pour temperature of a flexible polyether polyurethane foam composition. The flexible polyether polyurethane foam composition composed of 100 parts by weight of a polyoxypropylene adduct of glycerin, 4.5 parts by weight of water, 0.15 part by weight of triethylenediamine, 1.2 parts by weight of a polyoxyalkylene-siloxane copolymer, 0.25 part by weight of stannous octoate and 52.8 parts by weight of toluene isocyanate having 80 mol percent 2,4toluene diisocyanate and 20 mol percent 2,6toluene diisocyanate, was poured into the mold. The mold was closed and the foam was allowed to rise. The foam was then cured at 220° F. for 5 minutes. The flexible foamed article was then demolded. The flexible polyether polyurethane foam article released from the aluminum pan mold merely by inverting the mold. There was no adherence of the foam to the mold surface and the molded foam article had a skin which was an integral part of the foam body. The above procedure was repeated 24 times without further application of the conventional release wax and in each case the release of the foamed articles was equivalent to the first release.

EXAMPLE 2

The molding process of example 1 was carried out using a variety of molds which included an aluminum pan mold with restriction, an aluminum "L"-shaped mold, an aluminum pan mold for camera packaging, a "V"-shaped aluminum mold, a magnesium pan mold, a cast iron polytetrafluoroethylene coated breast mold, a stainless steel pan "bow tie"-shaped mold and a steel bucket seat mold coated with polytetrafluoroethylene, in place of the aluminum pan mold of example 1. The release properties were equivalent to those of example 1.

EXAMPLE 3

The procedure of example 1 was repeated using a semiflexible polyether polyurethane foam composition composed of 100 parts by weight of polyoxypropylene adducts of trimethylolpropane, 0.2 part by weight triethylamine, 0.25 part by weight of dibutyltin dilaurate, 3.0 parts by weight of water and 58.0 parts by weight of toluene diisocyanate having 65 mol percent 2,4-toluene diisocyanate an 35 mol percent 2,6-toluene diisocyanate. The release properties were equivalent to those of example 1.

EXAMPLE 4

The procedure of example 1 was repeated using a rigid polyether polyurethane foam composition composed of 100 parts by weight of a polyether glycol for rigid urethane foams, 35 parts by weight 0,0-diethyl-N,N-bis(2-hydroxyethyl)-aminomethylphosphonate 40 parts by weight trichloromonofluoromethane, 2 parts by weight tetramethylbutanediamine, 2 parts by weight dimethylethanolamine, 2 parts by weight of a polyoxyalkylene-silicone copolymer and 147 parts by weight diphenylmethane diisocyanate. The procedure of example 1 was used except that the rigid polyether polyurethane foam composition was poured and cured at room temperature. The release properties were equivalent to those of example 1.

The above rigid polyether polyurethane foam composition was used in a repeat run except that polyphenylpolymethylene isocyanate was used in place of the diphenylmethane diisocyanate. Equivalent release properties were obtained.

EXAMPLE 5

The procedure of example 1 was repeated using a flexible polyester polyurethane foam composition composed of 100 parts by weight of a commercial polyesterpolyol, 3.93 parts by weight of water, 2.15 parts by weight of N-ethyl morpholine, 1.0 parts by weight of a commercial silicone surfactant, 0.15 part by weight cetyldimethylamine, 4.5 parts by weight tricresylphosphate and 49.0 parts by weight toluene diisocyanate. The release properties were equivalent to those of example 1.

EXAMPLE 6

The procedures of examples 3 and 4 were repeated except that the wax was replaced with commercial room temperature vulcanizing silicone rubber. The release properties were equivalent to those of examples 3 and 4.

EXAMPLE 7

The procedure of example 1 was followed except as follows. The diorganopolysiloxanes, which follow, were applied to a cleaned aluminum pan mold by brushing a naphtha solution of 2 weight percent diorganopolysiloxane on the mold surface and wiping away any excess. A flexible polyether polyurethane foam composition composed of 61.25 weight percent of a polyoxypropylene adduct of glycerin, 2.76 weight percent water, 0.37 weight percent triethylenediamine, 1.53 weight percent of a commercial silicone surfactant, 0.15 weight percent stannous octoate, and 33.94 weight percent toluene diisocyanate was used in place of the flexible polyether polyurethane foam composition of example 1. The foam was cured for 25 minutes at 325° F. Each of the following diorganopolysiloxanes had release properties equivalent to that obtained in example 1.

A. $HO[(CH_3CH_2CH_2)(CH_3)SiO]_mH$ where $m$ had an average value sufficient to provide a viscosity of 830 cs. at 25° C.

B. $HO[(CH_3CH_2CH_2)(CH_3)SiO]_mH$ where $m$ had an average value sufficient to provide a viscosity of 3,980 cs. at 25° C.

C. $HO[(CH_3CH_2CH_2)(CH_3)SiO]_mH$ where $m$ had an average value sufficient to provide a viscosity of 100,000 cs. at 25° C.

D. $(CH_3)_3SiO[CH_3(CH_2)_9SiO]_mSi(CH_3)_3$ where $m$ had an average

value sufficient to provide a viscosity of 1,450 cps. at 77° F. and a freeze point of −71° C.

E. $(CH_3)_3SiO[R(CH_3)SiO]_mSi(CH_3)_3$ where each R was an alkyl group having from 15 to 20 carbon atoms and $m$ had an average value sufficient to provide a viscosity of 43.2 cs. at 100° C. and a freeze point of 29° C.

F. a diorganopolysiloxane having trimethylsiloxy end-blocking groups and composed of 90 mol percent of $R(CH_3)SiO$ units where each R was an alkyl group having from 16 to 20 carbon atoms and 10 mol percent of $[CH_3(CH_2)_9](CH_3)SiO$ units and having a viscosity of 718 cs. at 100° C. and a freeze point of 35° C.

G. a diorganopolysiloxane having trimethylsiloxy end-blocking groups and composed of 95 mol percent of $[CH_3(CH_2)_9](CH_3)SiO$ units and 5 mol percent of

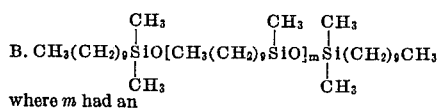

units and having a viscosity of 3,606 cs. at 77° F. and a freeze point of −40° C.

EXAMPLE 8

When each of the following diorganopolysiloxanes are substituted for any one of the diorganopolysiloxanes of examples 7, and the procedure of example 7 is followed, equivalent release properties are obtained.

A. $(CH_3)_3SiO[(CH_3\overset{CH_3}{\overset{|}{C}}HCH_2CH_2CH_2)(CH_3)SiO]_mSi(CH_3)_3$ where $m$ had an average value sufficient to provide a viscosity of 1,660 cs. at 77° F. and a freeze point of −85° C.

B. $CH_3(CH_2)_9\overset{CH_3}{\underset{CH_3}{\overset{|}{Si}}}O[CH_3(CH_2)_9\overset{CH_3}{\overset{|}{Si}}O]_m\overset{CH_3}{\overset{|}{Si}}(CH_2)_9CH_3$
where $m$ had an average value sufficient to provide a viscosity of 180 cs. at 77° F. and a freeze point of −43° C.

C. $R(CH_3)_2SiO[R(CH_3)SiO]_mSi(CH_3)_2R$ where each R was an alkyl radical having 14 to 16 carbon atoms and $m$ had an average value sufficient to provide a viscosity of 329 cs. at 77° F. and a freeze point of 15° C.

D. a diorganopolysiloxane having trimethylsiloxy end-blocking groups and composed of 70 mol percent $[CH_3(CH_2)_{15}](CH_3)SiO$ units and 30 mol percent

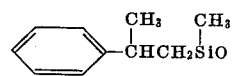

units and having a viscosity of 807 cs. at 77° F. and a freeze point of 15° C.

E. a diorganopolysiloxane having trimethylsiloxy end blocking groups and composed of 35 mol percent of $[CH_3(CH_2)_{13}](CH_3)SiO$ units, 35 mol percent of $[CH_3(CH_2)_9]$—$(CH_3)SiO$ units and 30 mol percent of

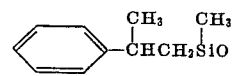

units and having a viscosity of 632 cs. at 77° F. and a freeze point at −27° C.

EXAMPLE 9

When each of the following diorganopolysiloxanes are substituted for the diorganopolysiloxane of example 1 and the procedure of example 1 is followed, equivalent release properties are obtained.

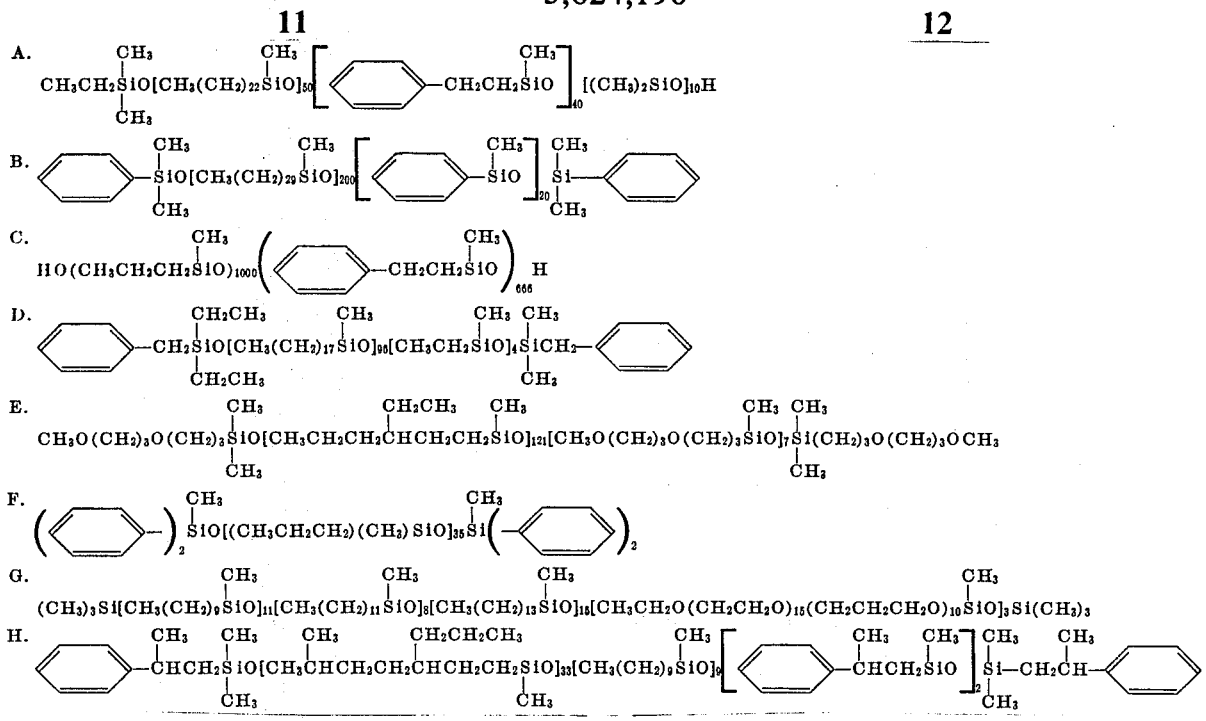

EXAMPLE 10

When the procedure of example 7 is repeated except a 10 weight percent solution of

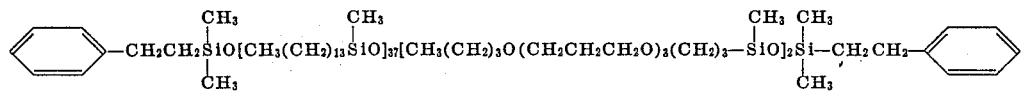

in mineral spirits is applied to the mold which was previously heated to 150° F. by wiping with a saturated cloth, equivalent release properties are obtained.

EXAMPLE 11

When the procedure of example 7 is repeated except a 5 weight per cent solution of

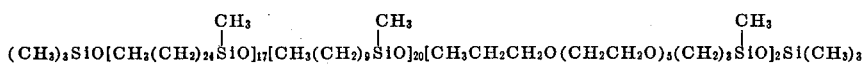

in carbon tetrachloride is in to the mold which was previously heated to 180° F. and then air was forced into the mold to assist in volatile removal, equivalent release properties are obtained.

EXAMPLE 12

When the procedure of example 1 is repeated except a 1 weight percent solution of

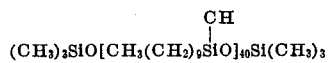

in methylisobutylketone is used, equivalent release properties are obtained.

EXAMPLE 13

When the procedure of example 1 is repeated except the mold is heated to 300° F. before the application of the diorganopolysiloxane, equivalent release properties are obtained.

EXAMPLE 14

When the procedure of example 1 is repeated except a 5 weight percent solution of hydroxyl end-blocked propyl- methylpolysiloxane is used, equivalent release properties are obtained.

That which is claimed is:
1. In a method of molding polyurethane foam comprising depositing a mold release agent selected from the group consisting of polyethylene, fluorocarbon polymers, silicone resins, organic waxes and silicone rubbers, on the surface of a mold whereby a treated mold surface is obtained, placing a polyurethane foam composition into the treated mold, allowing the foam to rise, curing the polyurethane foam and demolding to obtain a cured polyurethane foam product, the improvement consisting essentially of
  1. applying to the treated mold surface a diorganopolysiloxane in a liquid state wherein the diorganopolysiloxane consists essentially of
   a. at least 50 mol percent $R(CH_3)SiO$ units, wherein each R is an alkyl radical having from three to 30 carbon atoms,
   b. up to 40 mol percent of units selected from the group consisting of

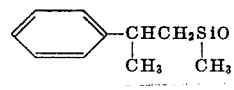

units and

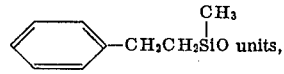

units, c. any remaining chain building units in an amount up to 10 mol percent being $R'(CH_3)SiO$ units wherein each R' is a monovalent organic radical selected from the group consisting of methyl, ethyl, phenyl, benzyl and $R''O(C_nHO)_x(CH_2)_3-$ wherein each R'' is a monovalent organic radical selected from the group consisting of methyl, ethyl, propyl, butyl,

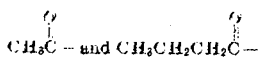

$n$ is an integer from 2 to 3 inclusive, and $x$ is an integer from 1 to 25 inclusive, and d. the polymer chains being end blocked by groups selected from the group consisting of triorganosiloxy groups and hydroxyl groups, the organo radicals being selected from the group consisting of

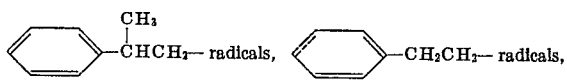

R and R' radicals, and removing any volatile materials from the diorganopolysiloxane treated mold and thereafter 2. bringing the diorganopolysiloxane treated mold to a pour temperature for a polyurethane foam composition.

2. The method according to claim 1, wherein the treated mold is heated to 150° to 300° F. before the application of the diorganopolysiloxane in the form of an organic solvent solution.

3. The method according to claim 2, wherein the diorganopolysiloxane is present in an amount of 1 to 10 weight percent of the organic solvent solution.

4. The method according to claim 3, wherein the diorganopolysiloxane is a hydroxyl end-blocked diorganopolysiloxane composed of $(CH_3CH_2CH_2)(CH_3)SiO$ units and is present in an amount from 1 to 5 weight percent of the organic solvent solution.

5. The method according to claim 3, wherein the diorganopolysiloxane is a trimethylsiloxy end-blocked diorganopolysiloxane composed of $R(CH_3)SiO$ units where each R is an alkyl group selected from the group consisting of decyl, hendecyl, dodecyl, tridecyl, tetradecyl, pentadecyl, hexadecyl, heptadecyl, octadecyl, nonadecyl and eicosyl and is present in an amount from 1 to 5 weight percent of the organic solvent solution.

6. The method according to claim 3, wherein the diorganopolysiloxane is a trimethylsiloxy end-blocked diorganopolysiloxane composed of 40 mol percent $[CH_3(CH_2)_9](CH_3)SiO$ units, 40 mol percent $[CH_3(CH_2)_{13}](CH_3)SiO$ units and 20 mol percent

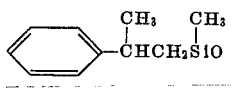

units and is present in an amount from 1 to 5 weight percent of the organic solvent solution.

7. The method according to claim 1 wherein an organic solvent solution is applied from an aerosol container.

8. The method according to claim 2 wherein the organic solvent solution is applied from an aerosol container.

9. The method according to claim 6, wherein the organic solvent solution is applied from an aerosol container.

10. The method according to claim 6, wherein the organic solvent solution is applied from a spray gun.

* * * * *